United States Patent
Zhang

(10) Patent No.: US 8,831,641 B2
(45) Date of Patent: Sep. 9, 2014

(54) ANSWERING SYSTEM AND METHOD FOR AUTOMATICALLY HANGING UP OR PUTTING THROUGH INCOMING CALLS

(75) Inventor: Pan Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 27 days.

(21) Appl. No.: 13/537,065

(22) Filed: Jun. 29, 2012

(65) Prior Publication Data
US 2013/0157714 A1    Jun. 20, 2013

(30) Foreign Application Priority Data
Dec. 17, 2011    (CN) .......................... 2011 1 0423699

(51) Int. Cl.
*H04W 72/00*    (2009.01)

(52) U.S. Cl.
USPC .................. 455/456.3; 455/550.1; 455/575.1; 455/418

(58) Field of Classification Search
CPC ........... H04W 4/00–4/27; H04W 4/16; H04M 1/0208–1/0245; H04M 1/6033–1/6041; H04M 2250/12
USPC ............. 455/550.1, 569.1, 570, 456.1, 556.1, 455/575.1
See application file for complete search history.

(56) References Cited

U.S. PATENT DOCUMENTS

| | | | |
|---|---|---|---|
| 6,269,256 B1 * | 7/2001 | Nakamura | 455/567 |
| 6,510,326 B1 * | 1/2003 | Martschink et al. | 455/550.1 |
| 8,060,151 B2 * | 11/2011 | Oberstelehn et al. | 455/570 |
| 2007/0123240 A1 * | 5/2007 | Hoffman | 455/417 |
| 2011/0098029 A1 * | 4/2011 | Rhoads et al. | 455/418 |
| 2012/0058803 A1 * | 3/2012 | Nicholson | 455/570 |

* cited by examiner

*Primary Examiner* — George Eng
*Assistant Examiner* — Joseph Dean, Jr.
(74) *Attorney, Agent, or Firm* — Novak Druce Connolly Bove + Quigg LLP

(57) ABSTRACT

An answering system including a first mobile phone, the first mobile phone includes a communication unit for communicating with a second mobile phone, a position sensor, a microphone, and a processor. The position sensor detects whether the first mobile phone is flat or tilted (balanced state or unbalanced state). The microphone detects vocal commands given to the first mobile phone. The processor acknowledges any incoming call when the first mobile phone is positioned in an unbalanced state and a conversation is detected in a preset time, and hangs up a call received previously when no command or conversation is detected in the preset time and the first mobile phone is positioned in a balanced state.

2 Claims, 6 Drawing Sheets

ANSWERING SYSTEM AND METHOD FOR AUTOMATICALLY HANGING UP OR PUTTING THROUGH INCOMING CALLS

TECHNICAL FIELD

The present disclosure relates to an answering system employing mobile phone and a method for putting through or hanging up an incoming call to the mobile phone, automatically.

DESCRIPTION OF RELATED ART

A smart mobile phone includes a touch screen. For example, when an incoming call is received, the user can touch an icon displayed on the screen to answer the coming call. However, the touch screen may have many icons displayed and the user may inadvertently activate another icon on the screen when retrieving or trying to take hold of the smart phone when answering incoming calls.

Thus, a mobile phone and a method using the same are desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and or hardware modules and may be stored in any type of non-transitory computer-readable medium or other storage device. Some non-limiting examples of non-transitory computer-readable medium include compact discs (CDs), digital video discs (DVDs), BLU-Ray disks, flash memories, and hard disk drives.

Figure 1:
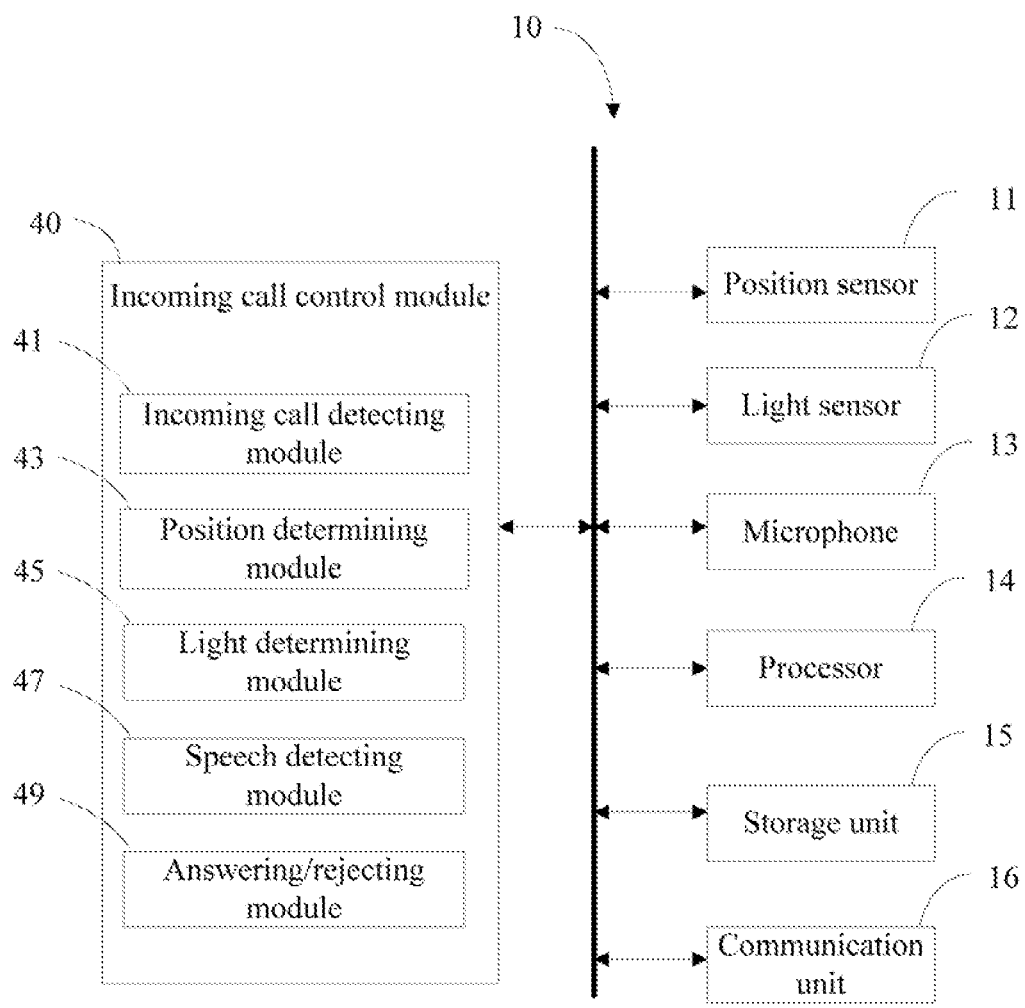
FIG. 1 is a block diagram illustrating one embodiment of an answering system using a mobile phone.

FIG. 1 is a block diagram illustrating one embodiment of an answering system using a mobile phone 10. The mobile phone 10 includes a position sensor 11, a light sensor 12, a microphone 13, a processor 14, a storage unit 15, a communication unit 16, and an incoming call control module 40. The incoming call control module 40 includes an incoming call detecting module 41, a position determining module 43, a light determining module 45, a speech detecting module 47, and an answering/rejecting module 49.

The communication unit 16 can communicate with other mobile phones. In one embodiment, the communication unit 16 may be selected from a group consisting of a global system for mobile communication (GSM) device, a code division multiple access (CDMA) device, or a wide band CDMA (WCDMA) device. The incoming call detecting module 41 detects any incoming call.

Figure 2:
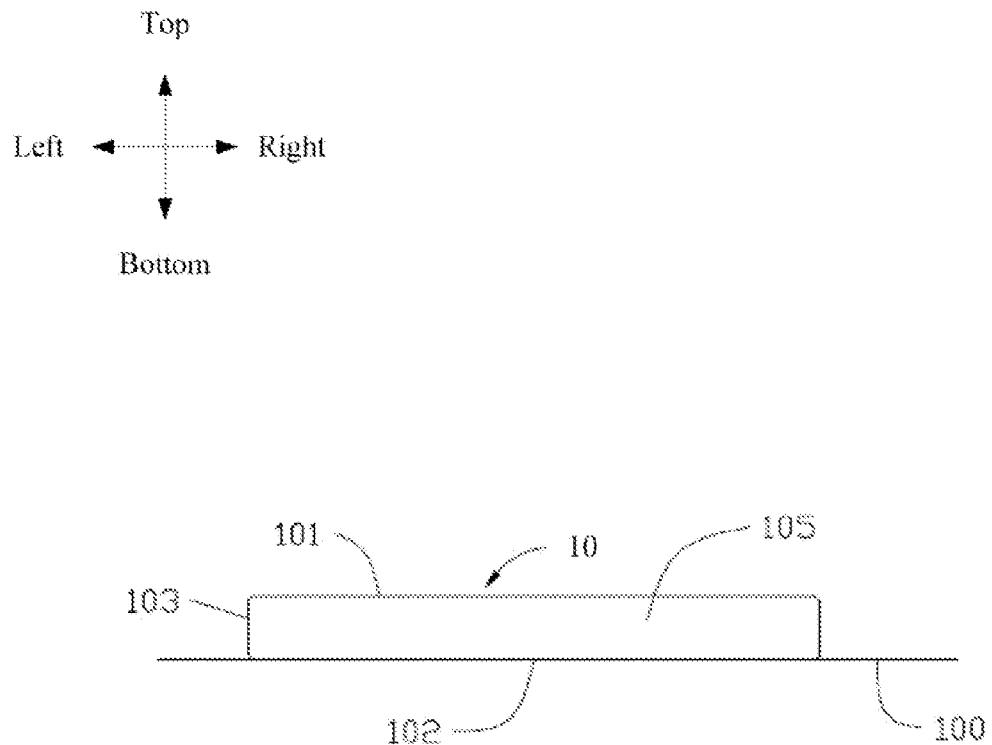
FIGS. 2-4 are schematic, side views of the mobile phone of FIG. 1 in different states.
Figure 3:
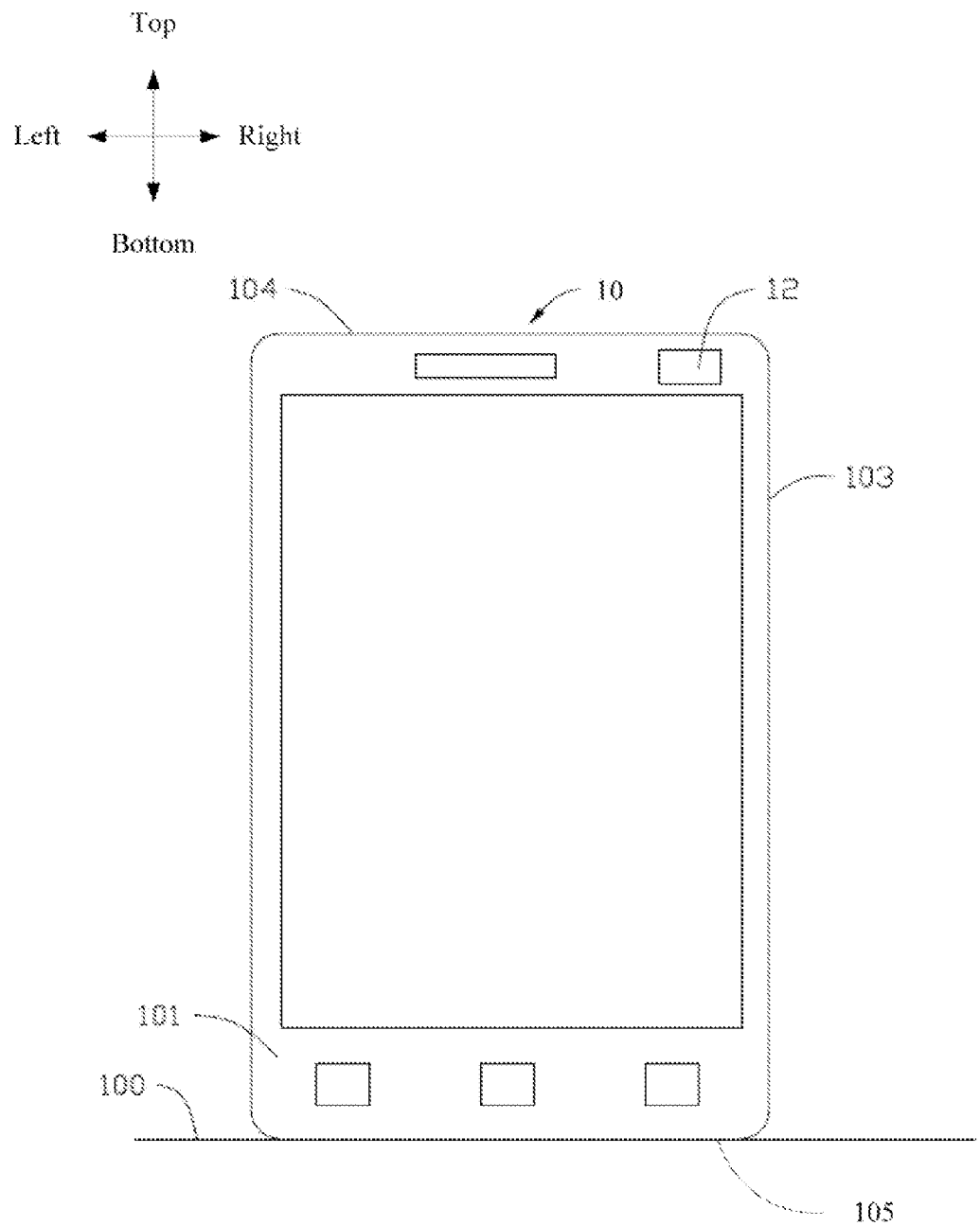
Figure 4:
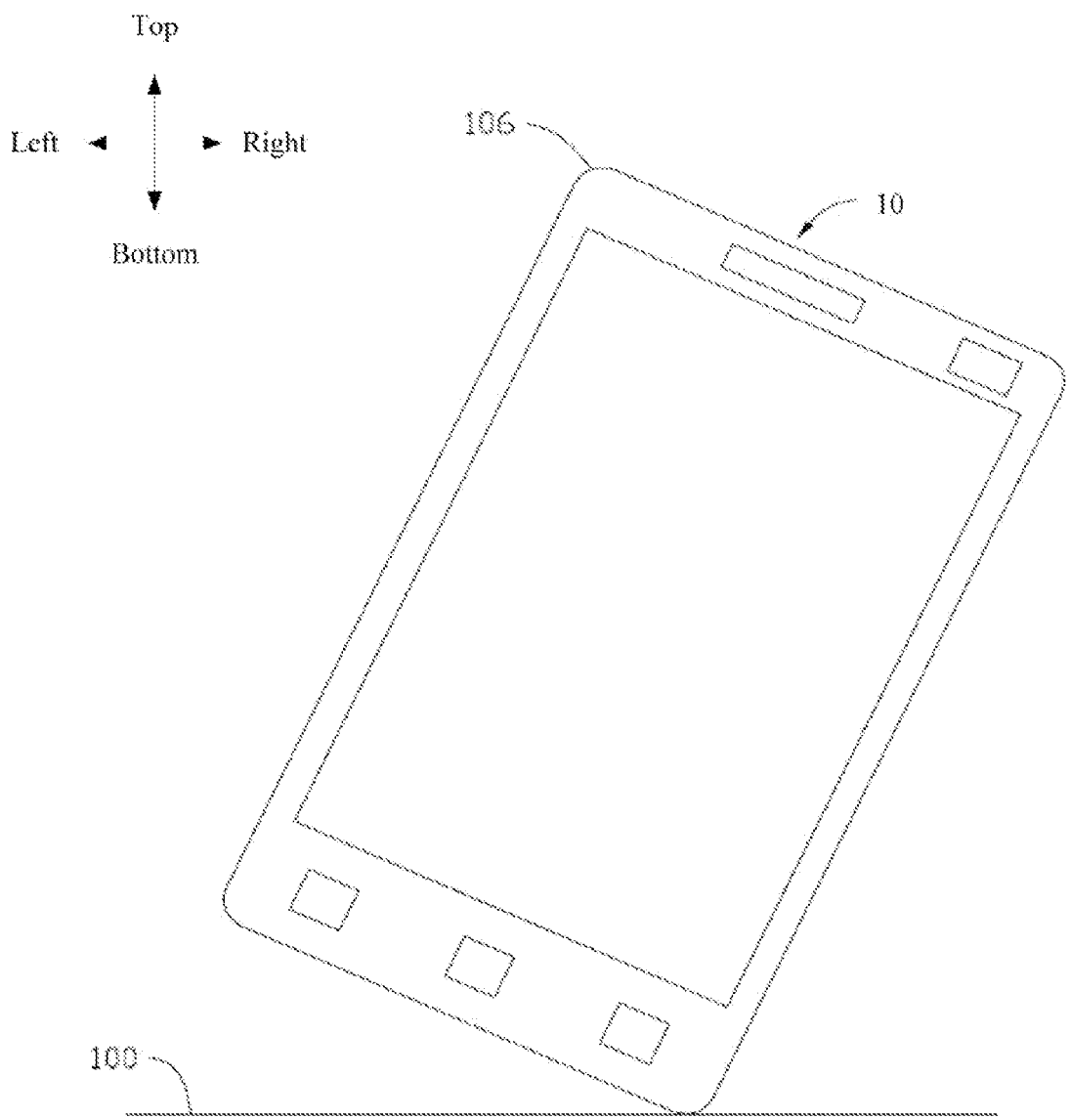

The position determining module 43 detects the orientation or position states of the mobile phone 10. In the embodiment, the position states include a balanced state and an unbalanced state. The processor 14 defines a balanced state as the mobile phone 10 being on a horizontal surface 100 with a front surface 101 or a back surface 102 of the mobile phone 10 resting on the horizontal surface 100 (as shown in FIG. 2), as detected by the position sensor 11. The definition of balanced state by the processor 14 includes the mobile phone 10 resting perpendicularly on the horizontal surface 100 with a top surface 104 or a bottom surface 105 of the mobile phone 10 resting on the horizontal surface 100 (as shown in FIG. 3). The processor 14 defines an unbalanced state when the position sensor 11 detects a first angle between the horizontal surface 100 and one of the front surface 101, the back surface 102, the top surface 104, and the bottom surface 105 as being within a range from five degrees to eighty five degrees as shown in FIG. 4. In an alternative embodiment, the processor 14 further defines a balanced state when the position sensor 11 detects a second angle between the horizontal surface 100 and each one of the front surface 101, the back surface 102, the top surface 104, and the bottom surface 105 as being within a range from zero degree to five degrees. In one embodiment, the position sensor 11 may be a gyroscope.

The light sensor 12 is arranged on the front surface 101 of the mobile phone 10. Through the light sensor 12, the light determining module 45 detects light increases or decreases of the environment in front of the front surface 101 within a first predetermined time, and provides data as to the increase or decrease in light intensity to the processor 14. The light determining module 45 compares the increase or decrease in light intensity in front of the front surface 101 against one or more reference levels of light intensity, and determines whether the increase or decrease in detected light is more or less than the reference level(s). In the embodiment, the light sensor 12 in fact is used to detect whether the front surface 101 is closed to or covered by the face of the user.

The speech detecting module 47 controls the microphone 13 to record sound and to provide a sample of the sound recorded to the processor 14 in a second predetermined time, and compares the sound sample with reference level of background or environmental noise, and determines whether the sound sample includes a level of sound which is greater than the reference level of the background or environmental noise in a second predetermined time, in other words, to determine if a voice command has been given to the mobile phone 10. In one embodiment, the environmental noise may also be detected by a second microphone (not shown).

The answering/rejecting module 49 controls the processor 14 to put through an incoming call or to hang up a current call according to the position states of the mobile phone 10, the light increases or decreases of the environment in front of the front surface 101 within a first predetermined time, and the sound sample detected by the speech detecting module 47.

The storage unit 15 pre-stores the level of environmental noise as a reference or average, the reference levels for an increase or decrease in light intensity, and stores the position states of the mobile phone 10. Data as to relevant sound samples (of commands or otherwise) is also recorded. In one embodiment, the storage unit 15 can be selected from a group consisting of CDs, DVDs, BLU-Ray disks, flash memories, and hard disk drives.

Figure 5:
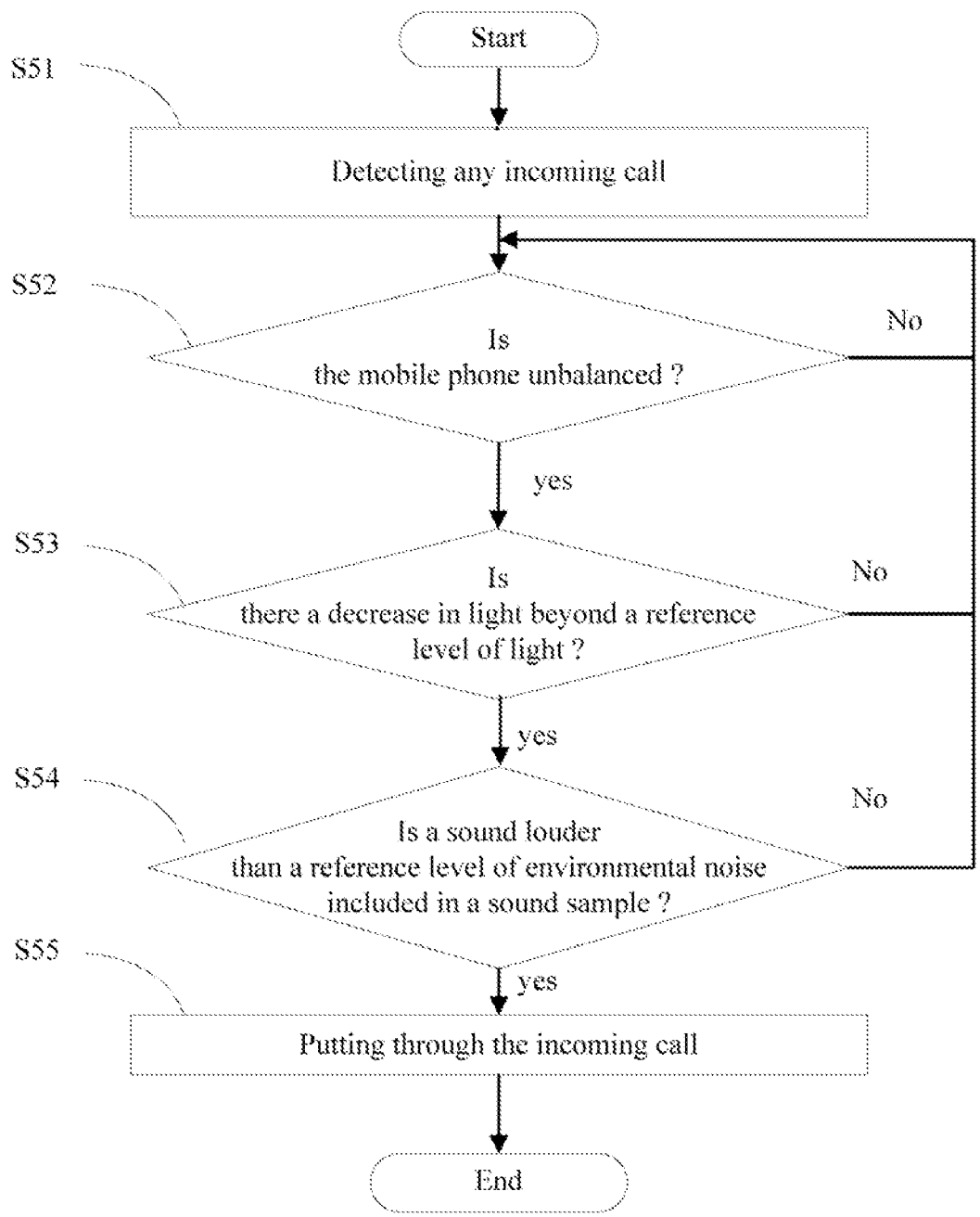
FIG. 5 is a flowchart of one embodiment of a method for automatically putting through an incoming call using the mobile phone of FIG. 1.

FIG. 5 is a flowchart of one embodiment of a method for automatically putting through or allowing an incoming call. The method may be carried out by using the mobile phone 10. Depending on the embodiment, additional steps may be added, others removed, and the ordering of the steps may be changed.

In step S51, the incoming call detecting module 41 detects any incoming call.

In step S52, the position determining module 43 detects the position state of the mobile phone 10, and determines whether the mobile phone 10 is balanced or unbalanced as described in detail above. If the mobile phone 10 is unbalanced, step S53 is performed, otherwise, step S52 is repeated.

In step S53, the light determining module 45 detects the level of light intensity in front of the front surface 101 in a first predetermined time, and the processor 14 then determines whether the light sampled shows an decrease in level against one or more reference levels in light intensity, in a first predetermined time. When there is decrease in light intensity beyond a reference level in light intensity, step S54 is performed, otherwise, the procedure goes back to step S52. In one embodiment, the first predetermined time is within a range of five to ten seconds In step S54, the speech detecting module 47 records sound and provide a sample of the sound to the processor 14. The processor 14 compares the sound sample with a reference level of environmental noise to determine whether the sound sample includes a sound which is louder than the reference level of environmental noise, in a second predetermined time, in other words, to determine if a voice command has been given to the mobile phone 10. When the sound sample includes a sound which is louder than the reference level of environmental noise, step S55 is performed, otherwise, the procedure goes back to step S52. In one embodiment, the second predetermined time is 0.1 seconds.

In step S55, the answering/rejecting module 49 automatically puts through the incoming call. In an alternative embodiment, the processor 14 may further control a display to display a message or warning when the incoming call is put through.

In alternative embodiments, step S53 may be omitted, and if the mobile phone 10 is unbalanced, step S54 is performed, otherwise, step S2 is repeated.

Figure 6:
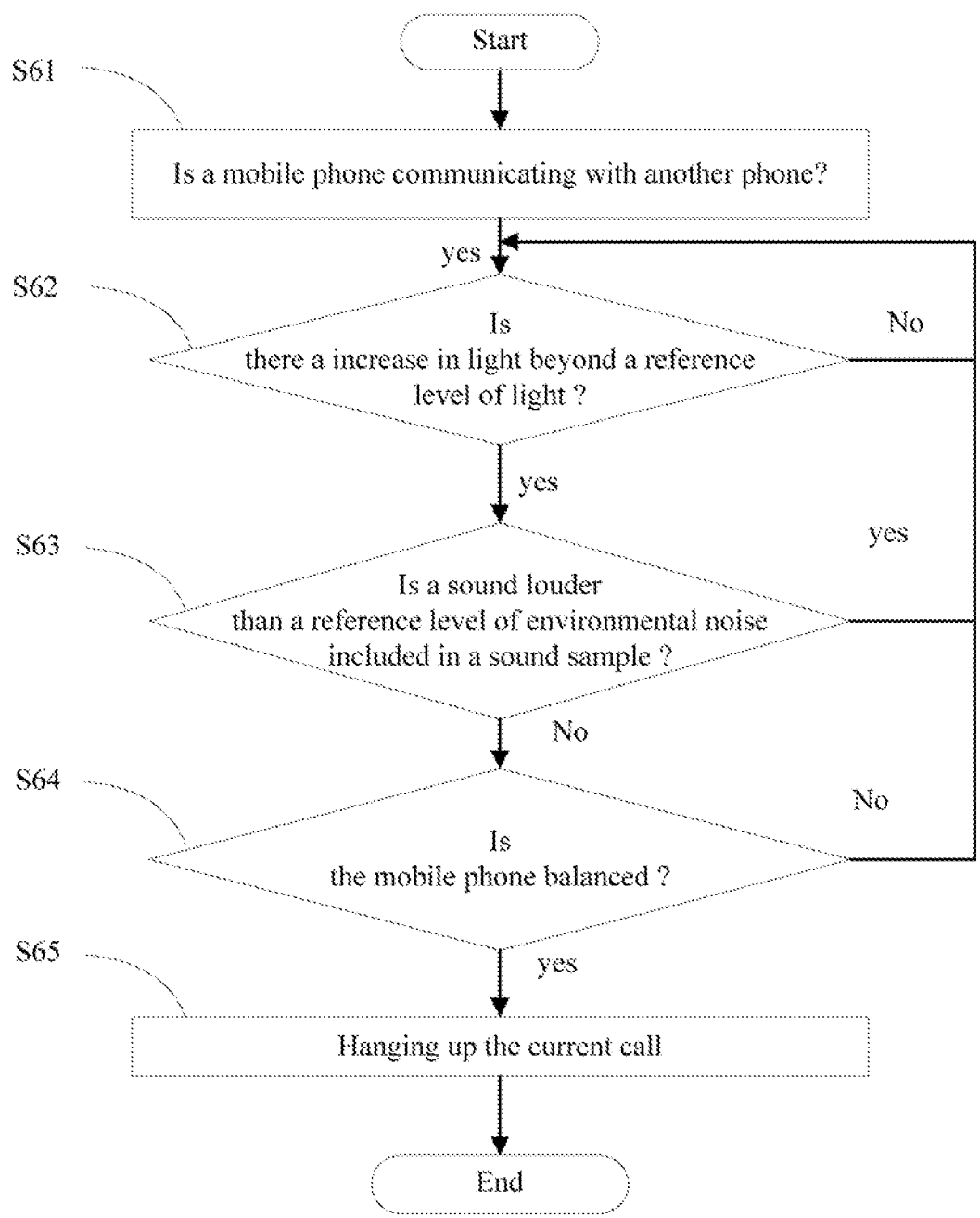
FIG. 6 is a flowchart of one embodiment of a method for automatically hanging up an incoming call using the mobile phone of FIG. 1.

FIG. 6 is a flowchart of one embodiment of a method for automatically closing or hanging up during a call. The method is carried out by using the mobile phone 10. Depending on the embodiment, additional steps may be added, others removed, and the ordering of the steps may be changed.

In step S61, the incoming call detecting module 41 detects whether the mobile phone is communicating with another phone.

In step S62, the light determining module 45 controls the light sensor 12 to detect an increase in light intensity of the environment in front of the front surface 101 within the first predetermined time, and the processor 14 then determines whether the decrease in light intensity beyond a reference level in light intensity within the first predetermined time. When the increase in light intensity is greater than the reference level in light intensity, step S63 is performed, otherwise, the procedure goes back to step S62. In one embodiment, the first predetermined time is within a range from five to ten seconds.

In step S63, the speech detecting module 47 controls the microphone 13 to record sound and provide a sound sample to the processor 14. The processor 14 compares the sound sample with a reference level of environmental noise to determine whether the sound sample includes a louder sound than the reference level of environmental noise within the second predetermined time, in other words, to determine if a voice command has been given to the mobile phone. When the sound sample includes a louder sound, step S64 is performed, otherwise, the procedure goes back to step S62. In one embodiment, the second predetermined time is 0.1 seconds.

In step S64, the position determining module 43 detects the orientation or position state of the mobile phone 10, and determines whether the mobile phone 10 is balanced or unbalanced as described in detail above. If the mobile phone 10 is balanced, step S65 is performed, otherwise, the procedure goes back to step S62.

In step S65 the answering/rejecting module 49 controls the processor 14 to automatically close or hang up the current call. In an alternative embodiment, the processor 14 may further control a display to display a message or warning when the current call is terminated.

In alternative embodiments, step S62 may be omitted, and if a conversation is continuing through the mobile phone 10, step S64 is performed, otherwise, step S63 is repeated.

Even though numerous characteristics and advantages of certain inventive embodiments have been set out in the foregoing description, together with details of the structures and functions of the embodiments, the disclosure is illustrative only; and changes may be made in detail, especially in the matter of arrangement of parts within the principles of present invention to the full extent indicated by the broad general meaning of the terms in which the appended claims are expressed.

What is claimed is:

1. An answering system comprising a first mobile phone, the first mobile phone comprising:
   a front surface, a back surface opposite to the front surface, a top surface adjacent to the front surface, and a bottom surface opposite to the top surface;
   a communication unit configured for communicating with a second mobile phone;
   a position sensor configured for detecting position states of the first mobile phone, the position states comprising a balanced state and an unbalanced state, wherein the unbalanced state is defined by the processor as being when the position sensor detects a first angle between a horizontal surface and one of the front surface, the back surface, the top surface, and the bottom surface as being within a range from five degrees to eighty five degrees;
   a microphone configured for recording sound and generating a sound sample; and
   a processor configured for putting through an incoming call made by the second mobile phone when the first mobile phone is in the unbalanced state and the sound sample comprises sound louder than a reference level of environmental noise in a preset time, and hanging up a current call when the sound sample does not comprise sound louder than the reference level of environmental noise in the preset time and the first mobile phone is in the balanced state.

2. A method of an answering system for automatically putting through an incoming call or hanging up a current call made by a second mobile phone to a first mobile phone, the first mobile phone comprising a front surface, a back surface opposite to the front surface, a top surface adjacent to the front surface, and a bottom surface opposite to the top surface, the method comprising:

receiving the incoming call by a communication unit of the first mobile phone;

detecting position states of the first mobile phone by a position sensor, the position states comprising a balanced state and an unbalanced state, wherein the unbalanced state is defined as being when the position sensor detects a first angle between a horizontal surface and one of the front surface, the back surface, the top surface, and the bottom surface as being within a range from five degrees to eighty five degrees;

recording sound and generating a sound sample by a microphone of the first mobile phone; and putting through the incoming call when the first mobile phone is unbalanced and the sound sample comprises sound louder than a reference level of environmental noise in a preset time; and hanging up the current call made by the second mobile phone when the sound sample does not comprise sound louder than the reference level of environmental noise in the preset time and the first mobile phone is balanced.

\* \* \* \* \*